M. GOHLKE & W. DAHLMANN.
MECHANISM FOR MEASURING THE PLAY BETWEEN RELATIVELY MOVABLE PARTS.
APPLICATION FILED JAN. 29, 1910.

1,062,566.

Patented May 20, 1913.

2 SHEETS—SHEET 1.

Witnesses:
Frank O. Ober
William C. Lang

Inventors
Max Gohlke
Wilhelm Dahlmann
By their Attorneys
Rogers & Kennedy

M. GOHLKE & W. DAHLMANN.
MECHANISM FOR MEASURING THE PLAY BETWEEN RELATIVELY MOVABLE PARTS.
APPLICATION FILED JAN. 29, 1910.
1,062,566.
Patented May 20, 1913.
2 SHEETS—SHEET 2.
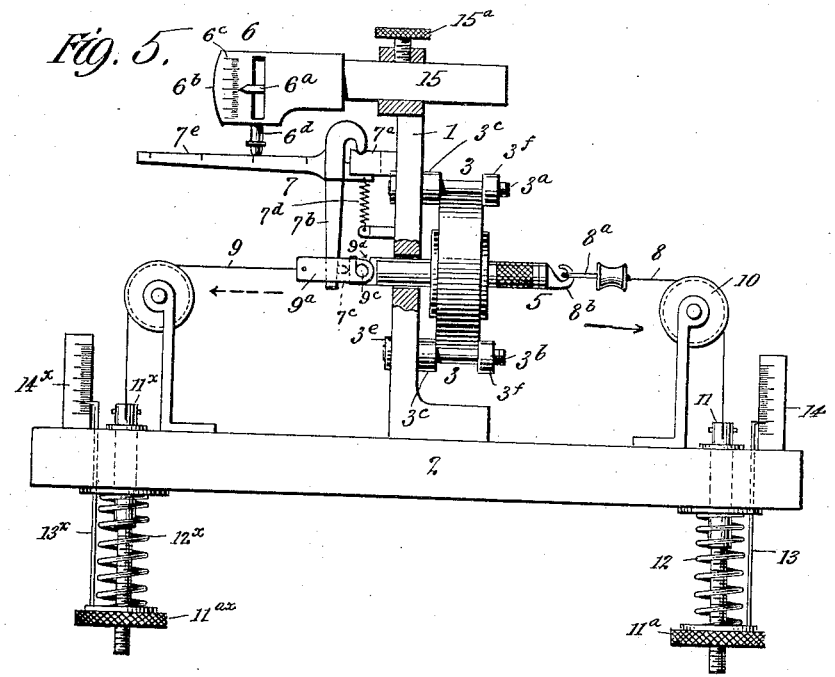
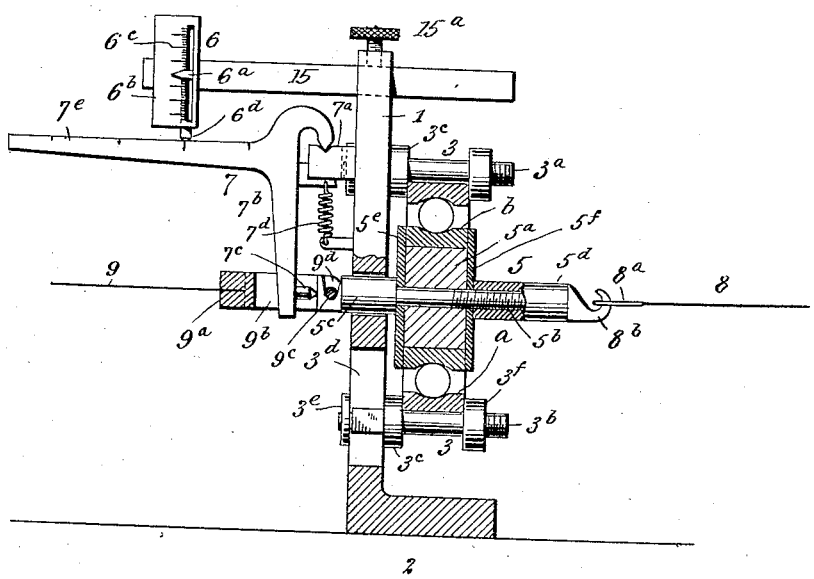

UNITED STATES PATENT OFFICE.

MAX GOHLKE, OF BERLIN, AND WILHELM DAHLMANN, OF TEGEL, NEAR BERLIN, GERMANY.

MECHANISM FOR MEASURING THE PLAY BETWEEN RELATIVELY MOVABLE PARTS.

1,062,566.  Specification of Letters Patent.  Patented May 20, 1913.

Application filed January 29, 1910. Serial No. 540,892.

*To all whom it may concern:*

Be it known that we, MAX GOHLKE, a subject of the Emperor of Germany, residing at Gneisenaustrasse 4, Berlin, Germany, and WILHELM DAHLMANN, a subject of the Emperor of Germany, residing at Schlieperstrasse 33, Tegel, near Berlin, Germany, have invented certain new and useful Improvements in Mechanism for Measuring the Play Between Relatively Movable Parts, of which the following is a specification, reference being had therein to the accompanying drawing.

The object of this invention is to provide means for indicating or measuring the amount of movement or play between relatively moving parts, and the invention is designed with special reference to the indication of such play in anti-friction bearings, and more particularly those of the type comprising inner and outer casing elements and interposed rolling members.

The play or movement to be measured in bearings of this type, is a movement distinct from the usual relative rotary movement of the parts, and is caused either by wear or inaccuracies in construction, or such as in most cases is purposely provided to ease the rotary movement of the parts. Such movements may result in a relative radial displacement of the parts, an actual displacement, a tilting or swinging displacement, or finally a rocking displacement, the invention being designed to indicate the extent of such displacement in whatever direction the displacing action takes place.

With the above objects and ends in view, the invention consists primarily of the combination with means for causing a relative displacement of the parts of the device, of an indicating mechanism adapted to be acted on by the displacing movement; whereby the extent of such movement may be indicated and measured.

In its more specific embodiment, and as applied to the measurement of play in anti-friction bearings of the type above described, the invention includes means for holding one of the parts of the bearing in fixed position, means for applying a displacing strain or force to the other part, and an indicating device adapted to be actuated by the displacing movement of said part.

Figure 1:
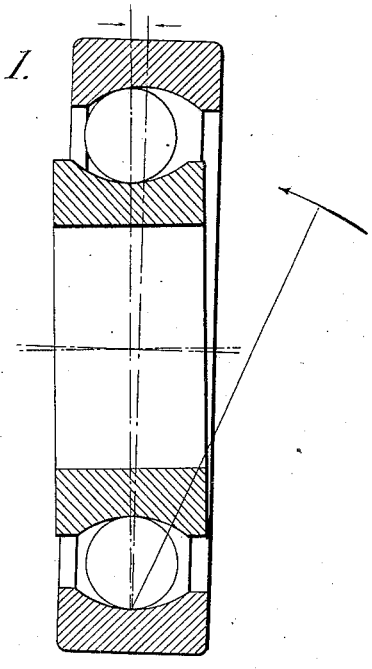
Figure 2:
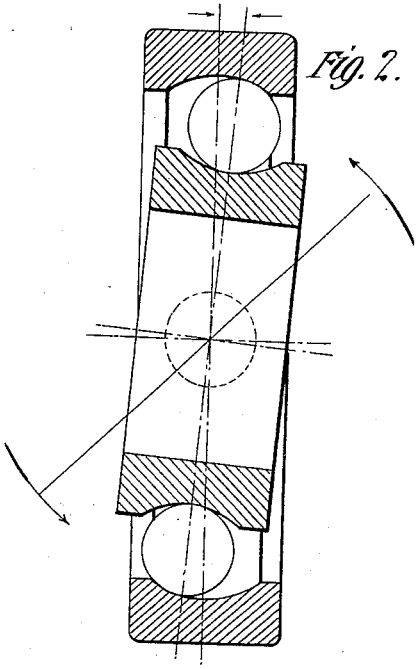
Figure 3:
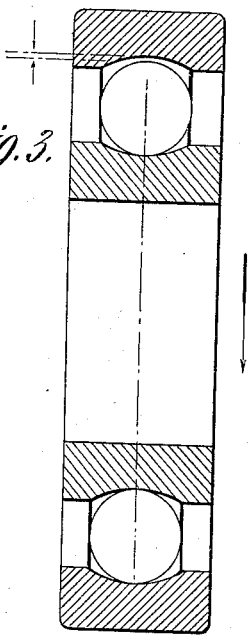
Figure 4:
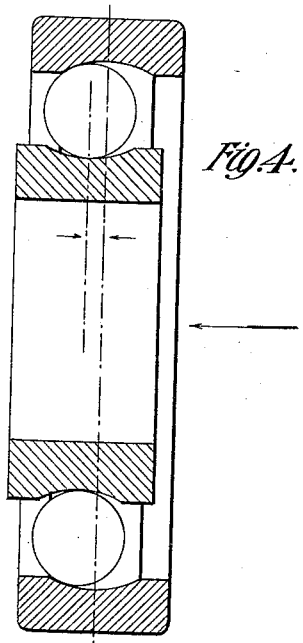

In the accompanying drawings:—Figure 1 represents an annular ball bearing illustrating a tilting displacement of the inner casing element. Fig. 2 is a similar view illustrating a rocking or swinging displacement of the inner casing element. Fig. 3 is a similar view showing a relative radial displacement between the parts. Fig. 4 is a similar view illustrating a relative axial displacement of the parts. Fig. 5 is a side elevation of the mechanism embodying our invention, with the bearing to be measured in place. Fig. 6 is a vertical longitudinal sectional elevation of the part of the same on an enlarged scale, certain of the parts illustrated in the preceding figure being omitted.

In its preferred form, the device comprises a standard 1 supported by a suitable base 2; clamping devices 3 mounted on the standard and adapted to fixedly support the outer casing element of the bearing to be measured; a displacing member 5 adapted to be attached to the inner casing element of the bearing and arranged to be subjected to a displacing strain or pull; a measuring or indicating device 6 sustained by the standard; and a transmitting device 7 also sustained by the standard and in position to be acted on by the displacing member and arranged to actuate the indicating device.

The clamping devices for fixedly holding the casing element of the bearing may be of any appropriate form or construction, but I prefer to employ for this purpose a number of horizontal stems or bolts $3^a$ and $3^b$, two in the present instance, provided near their inner ends with an annular shoulder $3^c$ seated against one side of the standard, with the inner ends of the stems extending through vertical slots $3^d$ therein and held adjustably in the slots by tightening nuts $3^e$ applied to the ends of the stems on the opposite side of the standard. At their opposite ends, the stems are threaded and have applied to them, clamping nuts $3^f$, between which and the shoulders $3^c$, the outer casing element $a$ of the bearing to be measured is firmly fixed and held, as shown in Fig. 6. By the movement of the stems in the slots, different sized bearings are adapted to be clamped in place.

The displacing device 5, before alluded to, comprises a bushing $5^a$ adapted to fit within the inner casing element $b$ of the bearing, which bushing is carried by a horizontal rod $5^b$, provided at one end with a shoulder $5^c$, and threaded at its opposite end to receive a clamping nut $5^d$. Between the shoulder and bushing, a bearing plate $5^e$ is applied to the rod, and is adapted at its outer edge to bear against one end of the casing element $b$. A second bearing plate $5^f$ is applied to the rod at the opposite end of the bushing and between it and the clamping nut $5^d$, the outer edge of this plate being adapted to bear against the casing element $b$ at this side. As a result of this construction, it will be seen that the inner casing element of the bearing may be firmly clamped between the bearing plates of the displacing member, the bushing within the casing element maintaining the parts in proper centered relations and preventing the rod of the displacing member from shifting transversely.

As shown more particularly in Fig. 5, the displacing member is acted on at opposite ends by tension bands or cords 8 and 9, by which means a tension or pull may be applied in either direction to the displacing member to cause an axial displacement of the inner casing element with reference to the other casing element, such displacement as is shown in Fig. 4. The cord 8 is connected at one end by means of an eye $8^a$ thereon, with a hook $8^b$ on the nut $5^d$, whence the cord passes over a guide pulley 10 sustained in a standard rising from the base 2, thence downwardly and is connected at its end with the upper end of a vertical rod 11 slidingly mounted in the base 2. The lower end of this rod, beneath the base, is threaded to receive an adjusting nut $11^a$, between which and the underside of the base, the rod is encircled by a spiral spring 12, the expansion of which tends to force the rod downwardly and thereby apply tension to the cord 8 so as to cause a pull to be exerted in the direction of the full line arrow in Fig. 5, on the displacing device. The degree of force exerted by the spring, which may by the nut be adjusted to suit the conditions, is indicated by means of a sliding pointer 13, acted on by the nut $11^a$ and adapted to be read in connection with a scale 14 on the base. The tension cord 9, and the mechanism connected thereto, which acts on the displacing member at the opposite end, is of identically the same construction as that described, being connected at its outer end to a vertically sliding rod $11^x$, provided with an adjusting nut $11^{ax}$ encircled by a spiral spring $12^x$, a pointer $13^x$ being acted on by the nut and adapted to be read in connection with a scale $14^x$ on the base 2. The cord 9, however, is connected with the displacing member by means of a stirrup or frame $9^a$, to which the cord is directly connected, and which stirrup is provided with a vertical slot $9^b$ in which extends a horizontal pin $9^c$ seated in an open slot $9^d$ in the end of the rod $5^b$ of the displacing member, by which means the tension cord may be readily disconnected from the displacing member when desired.

By means of the construction described, it will be seen that by the relative adjustments of the two tension adjusting nuts on the rods 11 and $11^x$, the displacing member may be subjected to a pull or strain acting in either direction, as desired, and tending to displace the inner casing element of the bearing in an axial direction with reference to the outer casing element.

The transmitting device 7, before alluded to, consists of an elbow lever hung at its upper end by a knife-edge on an arm $7^a$, projecting laterally from the standard 1, the vertical arm $7^b$ of the lever extending at its lower end in the slot in the stirrup $9^a$, at which point the arm is provided with a sharpened pin $7^c$ bearing against the end of the shoulder $5^c$ of the displacing member, the contact of the pin and shoulder being maintained by means of a spring $7^d$ connected at one end to the arm on the elbow lever, adjacent to its knife-edge support, and at its other end to the standard. From this construction, it will be seen that when the displacing member is moved to the left by its tension or pulling member, the end of rod $5^a$ acting on the lower end of the elbow lever, will rock said lever on its fulcrum and elevate the horizontal arm of the same, such movement being in proportion to the displacing movement or play existing between the parts of the bearing. The degree of this movement is indicated by the indicating or measuring device 6, before alluded to, which is acted on by the horizontal arm $7^e$ of the elbow lever. Any suitable form of indicating device to effect this object may be provided. In the drawings, I have shown the same in the form of a vertically sliding pointer $6^a$, mounted in a suitable frame or casing $6^b$, and adapted to be read in connection with a scale $6^c$ on the casing. The pointer has connected with it an actuating extension $6^d$, projecting downwardly and bearing against the upper edge of the arm $7^e$ of the elbow lever, so that the pointer will be moved along its scale according to the movements of the elbow lever due to the displacement of the casing element of the bearing. In order that such amount of displacement may be augmented in its action on the pointer, the indicating device is adjustable as a whole lengthwise of the arm $7^e$, thereby adjusting the leverage. This is effected by connecting the frame or casing $6^b$ to a horizontal bar 15 mounted to slide horizontally in a guideway in the standard, and held in its adjusted position by means of a set-screw $15^a$.

In the operation of the device, the bearing being set in place, as shown, and the displacing member connected with the inner casing element, the two tension springs 12 and 12ˣ are relatively adjusted to apply a pulling strain on the displacing member in either direction, as desired. If the strain is applied in the direction of the dotted arrow in Fig. 5, the movement of the displacing member will be transmitted to the elbow lever by the direct engagement of the end of shoulder 5ᶜ with the pin on the arm of the lever, and the movement of the latter will be transmitted to the indicating pointer, by which the extent of displacement may be directly read or computed. If the strain or pull is exerted on the displacing member in the opposite direction, as indicated by the full line arrow, the elbow lever will follow and move with the displacing member by reason of the action of the spring 7ᵈ, and the horizontal arm of the elbow lever will move downwardly, the extension on the pointer following the same and indicating the degree of movement by the scale, which is arranged to be read from a neutral point both upwardly and downwardly.

In the accompanying drawings we have shown our invention in the particular forms which we prefer to adopt, and which have been found to answer in a satisfactory manner the results and objects to be attained; but it will be understood that the invention may be embodied in other forms and that the details may be variously changed within the skill of the mechanic, without departing from the limits of the invention. And further, it will be understood that the invention is not limited to any particular form or construction of the parts except in so far as such limitations are specified in the claims.

Having thus described my invention, what I claim is:—

1. In a mechanism for measuring the extent of play between relatively movable parts which are independent of the mechanism, the combination of means for displacing one of the parts relatively to the other to take up the play, and an indicating device adapted to be actuated by the displaced part and operating to indicate the amount of movement of said part.

2. In a mechanism for measuring the extent of the play between relatively movable parts which are independent of the mechanism, the combination of means for supporting one of the parts, means for relatively displacing the other part to take up the play, and an indicating device adapted to be actuated by the displaced part and operating to indicate the amount of movement of the displaced part.

3. In a mechanism for measuring the extent of play between the parts of anti-friction bearings, the combination of means for displacing the parts of the bearing relatively to take up the play, and an indicating device adapted to be actuated by the displaced part and operating to indicate the amount of displaced movement of said part.

4. In a mechanism for measuring the extent of play between the parts of anti-friction bearings comprising outer and inner casing elements and interposed rolling members, the combination of means for fixedly holding one of the elements, means for displacing the other element relatively to take up the play, and an indicating device adapted to be actuated by the displaced member, and operating to indicate the amount of movement of said displaced part.

5. In a mechanism for measuring the extent of play between relatively movable parts, the combination of means for supporting one part, a movable member connected with the other part, means for applying a displacing strain to said movable member to displace said part and take up the play, and an indicating device adapted to be acted on by the movable member, and operating to indicate the amount of play.

6. In a machine for measuring the extent of play between relatively movable parts which are independent of the machine, the combination of means for supporting one of the parts, a movable member adapted to be connected with the other part, means for applying a displacing strain to the movable member to displace the connected part and take up the play, a transmitting member acted on by the movable member, and an indicating device acted on by the transmitting member and operating to indicate the extent of movement of said member.

7. In a mechanism for measuring the extent of play between relatively movable parts, the combination of means for supporting one of the parts, a movable member adapted to be connected with the other part, means for applying a displacing strain to the movable member to displace the connected part and take up the play, a transmitting member acted on by the movable member, and an indicating device actuated by the transmitting member and adjustable as a whole relatively to said transmitting member.

In testimony whereof we have affixed our signatures in presence of two witnesses.

MAX GOHLKE.
WILHELM DAHLMANN.

Witnesses:
 WOLDEMAR HAUPT,
 HENRY HASPER.